(12) United States Patent
Agarwal

(10) Patent No.: US 11,661,003 B1
(45) Date of Patent: May 30, 2023

(54) METHODS AND APPARATUS FOR SAFETY SUPPORT WITH UNMANNED VEHICLES

(71) Applicant: PlusAI, Inc., Cupertino, CA (US)

(72) Inventor: Ankur Agarwal, San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/837,515

(22) Filed: Jun. 10, 2022

(51) Int. Cl.

| | | |
|---|---|---|
| *B64C 39/02* | (2023.01) | |
| *G05D 1/00* | (2006.01) | |
| *B64D 47/00* | (2006.01) | |
| *G08G 1/00* | (2006.01) | |
| *B60Q 7/02* | (2006.01) | |
| *G05D 1/10* | (2006.01) | |
| *G05D 1/02* | (2020.01) | |
| *G08G 1/0955* | (2006.01) | |
| *G08G 1/16* | (2006.01) | |
| *B64U 80/86* | (2023.01) | |
| *B64U 101/30* | (2023.01) | |

(52) U.S. Cl.
CPC ............. *B60Q 7/02* (2013.01); *B64C 39/024* (2013.01); *B64D 47/00* (2013.01); *G05D 1/028* (2013.01); *G05D 1/0246* (2013.01); *G05D 1/0278* (2013.01); *G05D 1/101* (2013.01); *G08G 1/0955* (2013.01); *G08G 1/166* (2013.01); *B64U 80/86* (2023.01); *B64U 2101/30* (2023.01)

(58) Field of Classification Search
CPC .......... B60Q 7/02; B60Q 7/00; B64C 39/024; B64C 2201/127; B64C 2201/208; B64C 39/02; B64D 47/00; G05D 1/0246; G05D 1/0278; G05D 1/028; G05D 1/101; G08G 1/0955; G08G 1/166; G08G 1/16
See application file for complete search history.

(56) References Cited

U.S. PATENT DOCUMENTS

| | | | | |
|---|---|---|---|---|
| 7,085,637 | B2 * | 8/2006 | Breed | G08G 1/163 |
| | | | | 701/470 |
| 7,202,776 | B2 * | 4/2007 | Breed | G08G 1/161 |
| | | | | 340/557 |
| 9,898,846 | B1 * | 2/2018 | Borras | G06T 11/206 |
| 10,134,280 | B1 * | 11/2018 | You | B60Q 1/525 |
| 10,916,131 | B1 * | 2/2021 | Schottland | G08G 1/0133 |

(Continued)

FOREIGN PATENT DOCUMENTS

| | | | | |
|---|---|---|---|---|
| DE | 112015007123 T5 * | 7/2018 | | B60Q 1/52 |
| WO | WO-2009027244 A1 * | 3/2009 | | B60W 30/16 |

(Continued)

*Primary Examiner* — Yonel Beaulieu
(74) *Attorney, Agent, or Firm* — Sheppard Mullin Richter & Hampton LLP

(57) ABSTRACT

In some embodiments, an apparatus, comprises an unmanned vehicle configured to be disposed with a vehicle and a processor operatively coupled to the unmanned vehicle. The processor is configured to receive a first signal indicating a stop of the vehicle without a user request and a second signal indicating a location of the vehicle. The processor is configured to determine, based on the location of the vehicle, a target location in a pre-defined area surrounding the vehicle. The processor is configured to send a third signal to the unmanned vehicle to instruct the unmanned vehicle to move to the target location to alert other vehicles via a warning regarding occurrence of the stop.

20 Claims, 5 Drawing Sheets

(56) References Cited

U.S. PATENT DOCUMENTS

| | | | | |
|---|---|---|---|---|
| 2009/0174573 A1* | 7/2009 | Smith | ............... | G08G 1/0962 |
| | | | | 340/905 |
| 2013/0311075 A1* | 11/2013 | Tran | ............... | B60W 50/14 |
| | | | | 701/117 |
| 2020/0167603 A1* | 5/2020 | Ung | ............... | G06T 11/60 |

FOREIGN PATENT DOCUMENTS

| | | | | |
|---|---|---|---|---|
| WO | WO-2017082903 A1 * | 5/2017 | ............... | B60Q 1/52 |
| WO | WO-2021207429 A1 * | 10/2021 | ......... | H04L 25/0246 |

* cited by examiner

METHODS AND APPARATUS FOR SAFETY SUPPORT WITH UNMANNED VEHICLES

FIELD

The present disclosure relates to driving support for vehicles (such as semi-autonomous vehicles or autonomous vehicles), and more specifically, to use unmanned vehicles for safety support of the vehicle.

BACKGROUND

In the field of autonomous driving (semi-autonomous driving, etc.), sensing and control technology can be used in a moving vehicle to make correct vehicle control decisions in dynamic situations. Responding to emergency situations to keep the vehicle safe and to warn other drivers of a potentially dangerous situation is desirable. In emergency situations such as vehicle break down, flat tire, fuel or fluid outage/shortage, failed battery, faulty sensors etc., emergency signs can be placed around the vehicle in compliance with the rules from a transportation regulatory body(ies) to alert other vehicles sharing the same road. Currently, there is a lack for automatic emergency sign placement in emergency situations.

SUMMARY

In some embodiments, an apparatus comprises an unmanned vehicle configured to be disposed with a vehicle and a processor operatively coupled to the unmanned vehicle. The processor is configured to receive a first signal indicating a stop of the vehicle without a user request and a second signal indicating a location of the vehicle. The processor is configured to determine, based on the location of the vehicle, a target location in a pre-defined area surrounding the vehicle. The processor is configured to send a third signal to the unmanned vehicle to instruct the unmanned vehicle to move to the target location to alert other vehicles via a warning regarding occurrence of the stop.

In some embodiments, a method comprises receiving, at a processor, a first signal indicating (1) a stop of a vehicle, (2) a location of the vehicle, and (3) geography data of a pre-defined area surrounding the vehicle. The method also includes determining, by the processor and based on the first signal, a set of target locations near the vehicle. The method includes sending, from the processor, a second signal to an unmanned vehicle to instruct the unmanned vehicle to move to each target location from the set of target locations to dispatch each warning sign from a set of warning signs to alert other vehicles regarding occurrence of the stop.

In some embodiments, a non-transitory processor-readable medium stores code representing instructions to be executed by a processor. The code comprises code to cause the processor to receive, at the processor, a first signal indicating (1) a stop of a vehicle, (2) a location of the vehicle, and (3) geography data of a pre-defined area surrounding the vehicle. The code also causes the processor to determine, based on the first signal, a first target location and a second target location in a pre-defined area surrounding the vehicle. The code causes the processor to send a second signal to a first unmanned vehicle to instruct the first unmanned vehicle to move to the first target location to dispatch a first warning sign to alert other vehicles regarding occurrence of the stop. The code causes the processor to send a third signal to a second unmanned vehicle to instruct the second unmanned vehicle to move to the second target location to dispatch a second warning sign to alert the other vehicles regarding the occurrence of the stop, the second unmanned vehicle being different from the first unmanned vehicle.

DETAILED DESCRIPTION

Figure 1:
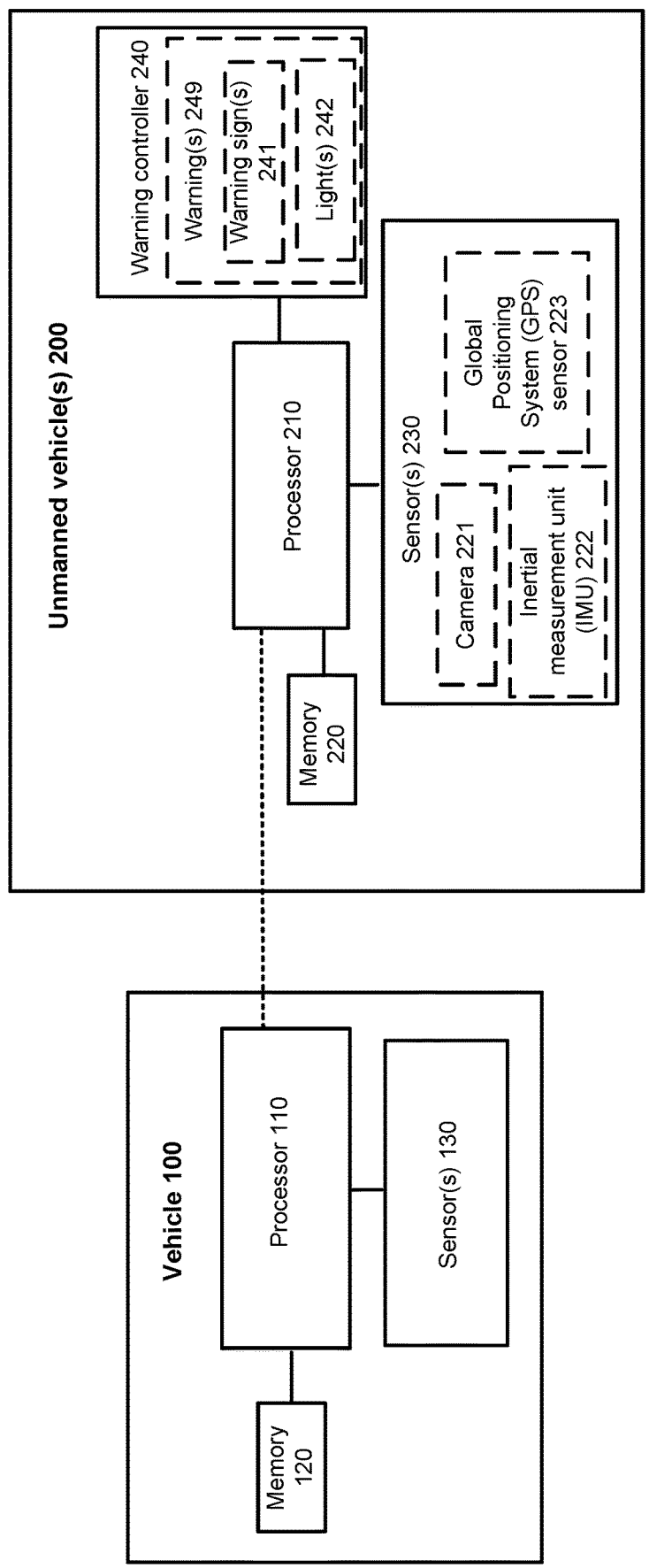
FIG. 1 is a block diagram showing a vehicle with unmanned vehicle(s) for safety support, according to an embodiment.

In the field of autonomous driving (semi-autonomous device, etc.), sensing and control technology can be used in a moving vehicle to make correct vehicle control decisions in dynamic situations. Responding to emergency situations to keep the vehicle safe and to warn other drivers of a potentially dangerous situation is desirable. In situations such as vehicle break down, flat tire, fuel or fluid outage/shortage, failed battery, faulty sensors etc., warning signs can be placed around the vehicle in compliance with the rules from a transportation regulatory body(ies) to alert other vehicles sharing the same road. Thus, it is desirable to have a method and apparatus for automatically placing the warning sign during situations such as emergency situations. Moreover, in vehicles such as autonomous vehicles (semi-autonomous vehicles, etc.), sensors can be used in assisted or autonomous driving. In situations of sensor failure or damage, it is desirable to have a method and apparatus for providing a backup for sensor data collection and/or notification to appropriate personnel such as emergency personnel.

A vehicle can operate in a manual driving mode, or a vehicle can operate in a manual driving mode during one time period and operate in a partially autonomous mode or a fully autonomous driving mode during a different time period. Autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). In some instances, a given level can include the capabilities included in the lower level(s); for example, level 2 can include the momentary driver assistance of level 0 and the driver assistance of level 1 but can also include additional assistance associated with level 2. An autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. For example, an autonomous capable vehicle can operate in a given level (e.g., level 2), which can be deactivated to allow a driver to operate the vehicle manually (i.e., in a manual driving mode). As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

FIG. 1 is a block diagram showing a vehicle with unmanned vehicle(s) for safety support, according to an embodiment. The vehicle 100 (such as an autonomous vehicle) can be any type of vehicle, such as a car, bus, or semitruck. As shown in FIG. 1, the vehicle 100 includes a processor 110, a memory 130 operatively connected to the processor 110, and a sensor(s) 130 operatively connected to the processor 110. The unmanned vehicle(s) 200 is disposed with the vehicle 100 and communicatively connected to the processor 110 of the vehicle 100. The unmanned vehicle(s) 200 can be disposed inside the vehicle 100 or on the vehicle 100 via an opening(s) (not shown). The opening(s) for disposing the unmanned vehicle(s) 200 can be an opening specifically designed for the unmanned vehicle(s) 200 or any preexisting opening or space available in or on the vehicle 100. For example, the opening or space can be a docketing station on top of the vehicle 100, a docketing station on bottom of the vehicle, a storage space in the truck, or docketing station in a trailer, etc. The unmanned vehicle(s) 200 can be any type of unmanned vehicle, such as unmanned ground vehicle (UGV), unmanned aerial vehicle (UAV), unmanned combat vehicle, unmanned underwater vehicle, unmanned micro air vehicle, drone, long-endurance unmanned vehicle, unmanned surface vehicle, miniature unmanned vehicle, etc. As shown in FIG. 1, the unmanned vehicle 200 includes a processor 210, a memory 220 operatively connected to the processor 210, a sensor(s) 230 operatively connected to the processor 210, and a warning controller 240 operatively connected to the processor 210.

The processor 110 can be configured to perform (or cause to be performed) any of the techniques, methods and/or portions of methods discussed herein. The processor 210 can be configured to receive instructions from the processor 110 and to send information (e.g., sensor data recorded by sensor(s) 230) to the processor 110. The warning controller 240 can be configured to receive instructions from the processor 210 and control the warning(s) 249. The processor 110, the processor 210, and the warning controller 240 can be or include, for example, a hardware based integrated circuit (IC) or any other suitable processing device configured to run and/or execute a set of instructions or code. For example, the processor 110, the processor 210 and warning controller 240 each can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. Although as shown in FIG. 1 the processor 110 is disposed within the vehicle 100, in alternative implementations, or the processor can be remote from the vehicle 100. Although as shown in FIG. 1 the processor 210 is disposed within the unmanned vehicle 200, in alternative implementations, or the processor 210 can be remote from the unmanned vehicle 200.

The memory 120 and the memory 220 each can be, for example, a random-access memory (RAM), a memory buffer, a hard drive, a read-only memory (ROM), an erasable programmable read-only memory (EPROM), and/or the like. The memory 120 can be configured to store sensor data collected by the sensor(s) 130, data received from the unmanned vehicle 200, and any other data used by the processor 110 to perform the techniques discussed herein. The memory 220 can be configured to store sensor data collected by the sensor(s) 230, instructions received from processor 110, and any other data used by the processor 210 to perform the techniques discussed herein. In some instances, the memory 120 can store, for example, one or more software programs and/or code that can include instructions to cause the processor 110 to perform one or more processes, functions, and/or the like. In some instances, the memory 220 can store, for example, one or more software programs and/or code that can include instructions to cause the processor 210 to perform one or more processes, functions, and/or the like. In some implementations, the memory 120 and the memory 220 can include extendible storage units that can be added and used incrementally. In some implementations, the memory 120 can be a portable memory (for example, a flash drive, a portable hard disk, and/or the like) that can be operatively coupled to the processor 110. In some implementations, the memory 220 can be a portable memory (for example, a flash drive, a portable hard disk, and/or the like) that can be operatively coupled to the processor 210. In some instances, the memory 120 and the memory 220 can be remotely operatively coupled with a compute device (not shown). For example, a remote database device can serve as a memory and be operatively coupled to the processor 110 or a remote database device can serve as a memory and be operatively coupled to the processor 210. The processor 110 can access data stored on the memory 120, for example, the processor 110 can access at least the data collected by the sensor(s) 130 and stored in the memory 120, or data received from the unmanned vehicle 200 and stored in the memory 120. The processor 210 can access data stored on the memory 220, for example, the processor 210 can access at least the data collected by the sensor(s) 230 and stored in the memory 220, or data received from the processor 110 of the vehicle 100 and stored in the memory 120.

The memory 120 can store instructions that can be executed by the processor 110, and/or data detected by the sensor(s) 130. The memory 120 can store one or more software algorithm(s) (not shown). The software algorithm(s) can be, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s). After the processor 110 has received the data from the unmanned vehicle 200 and/or from sensor(s) 130, the processor 110 can process the data using software algorithm(s) stored in the memory 120 to perform one or more processes, functions, and/or the like discussed herein.

The memory 220 can store the instructions that can be executed by the processor 210, and/or data detected by the sensor(s) 230. The memory 220 can store one or more software algorithm(s) (not shown). The software algorithm(s) can be, for example, an artificial intelligence (AI) model(s) or algorithm(s), a machine learning (ML) model(s) or algorithm(s), an analytical model(s) or algorithm(s), a rule-based model(s) or algorithm(s), or a mathematical model(s) or algorithm(s). After the processor 210 has received the instructions from the vehicle 100 and/or sensor data collected from sensor(s) 230, the processor 210 can process the instructions using software algorithm(s) stored in the memory 220 to perform one or more processes, functions, and/or the like discussed herein, or can process the sensor data collected from sensor(s) 230 and send to the vehicle 100.

The sensor(s) 130 can include one or more sensors for collecting sensor data associated with the vehicle 100. The sensor(s) 130 can be used to observe and gather any information that would be useful for performing the techniques discussed herein, such as information associated with an external environment of the vehicle 100 and/or the vehicle 100 itself. The sensor(s) 130 can include, for example, at least one of a camera(s), a radar(s), a lidar(s), a sonar(s), or an inertial measurement unit(s) (IMU(s)). The sensor(s) 130 can generate sensor data that includes representations of attributes associated with the vehicle 100, such as a speed of the vehicle 100, location, an acceleration of the vehicle 100, a size of the vehicle 100, a weight of the vehicle 100, etc. Additionally or alternatively, the sensor(s) 130 can generate sensor data that includes representations of attributes associated with an external environment of the vehicle 100, such as a speed, location, acceleration, size, type, relative distance, movement pattern, etc. of other vehicles, pedestrians, animals, obstacles, rain drops, snowflakes, haze particle, fog particle, etc., and/or location, type, relative distance, size, shape, etc. of signs, lane markers, shoulder areas, roads, buildings, etc. In some implementations, sensor data collected by the sensor(s) 130 includes information representing a geography data surrounding the vehicle 100, such as a road, sign, traffic light, walkway, building, body of water, etc. The camera can be for example one or more of: a thermal imager camera, an infrared camera, a stereo camera, a time of flight camera, an red/green/blue (RGB) camera, a two-dimensional (2-D) camera, a three-dimensional (3-D) camera, a 360-degree camera, etc. The radar can be for example one or more of: an imaging radar, a 3-D radar, a four-dimensional (4-D) radar, a short-range radar, a medium-range radar, a long-range radar, a pulse-Doppler radar, a frequency-modulated continuous-wave (FMCW) radar, etc. The lidar can be for example one or more of: an amplitude modulated lidar, a frequency modulated lidar, a mechanical lidar, a microelectromechanical systems lidar, a flash lidar, an optical phase array lidar, a frequency-modulated continuous-wave (FMCW) lidar, a time of flight scanning lidar, etc. The sonar can be for example one or more of: an active sonar, a passive sonar, etc. The IMU can include, for example, one or more of an accelerometer(s), a gyroscope(s) or a magnetometer(s). Of course, other types of sensors exist and the examples above are not meant to be exhaustive.

The sensor(s) 230 can include one or more sensors for collecting sensor data associated with the vehicle 100. The sensor(s) 230 are disposed with the unmanned vehicle 200. The sensor(s) 130 can be used to observe and gather any information that would be useful for performing the techniques discussed herein, such as information associated with an external environment of the vehicle 100 and/or the vehicle 100 itself. The sensor(s) 230 can include, for example, at least one of a camera 221, an inertial measurement unit (IMU) 222, or a Global Positioning System (GPS) sensor 223. The sensor(s) 230 can generate sensor data that includes representations of attributes associated with the vehicle 100, such as a speed of the vehicle 100, location, an acceleration of the vehicle 100, a size of the vehicle 100, a weight of the vehicle 100, etc. Additionally or alternatively, the sensor(s) 230 can generate sensor data that includes representations of attributes associated with an external environment of the vehicle 100, such as a speed, location, acceleration, size, type, relative distance, movement pattern, etc. of other vehicles, pedestrians, animals, obstacles, rain drops, snowflakes, haze particle, fog particle, etc., and/or location, type, relative distance, size, shape, etc. of signs, lane markers, shoulder areas, roads, buildings, etc. In some implementations, sensor data collected by the sensor(s) 230 includes information representing a geography data surrounding the vehicle 100, such as a road, sign, traffic light, walkway, building, body of water, etc. In some implementations, the sensor(s) 230 can generate sensor data includes representations of attributes associated with the unmanned vehicle 200, such as a speed of the unmanned vehicle 200, a location of the unmanned vehicle 200, an acceleration of the unmanned vehicle 200, a size of the unmanned vehicle 200, a weight of the unmanned vehicle 200, etc. Additionally or alternatively, the sensor(s) 230 can generate sensor data that includes representations of attributes associated with an external environment of the unmanned vehicle 200, such as a speed, location, acceleration, size, type, relative distance, movement pattern, etc. of other vehicles, pedestrians, animals, obstacles, rain drops, snowflakes, haze particle, fog particle, etc., and/or location, type, relative distance, size, shape, etc. of signs, lane markers, shoulder areas, roads, buildings, etc. The camera 221 can be for example one or more of: a thermal imager camera, an infrared camera, a stereo camera pair, a time of flight camera, an red/green/blue (RGB) camera, a 2-D camera, a 3-D camera, a 360-degree camera, or etc., or any combination thereof. The IMU 222 can include one or more of accelerometer, gyroscope, or magnetometer or any combination thereof. The IMU 222 can work together with the camera 221 to establish visual-inertial odometry that can determine the location of the unmanned vehicle 200 and/or the location of the vehicle 100, and that can be used to navigate the unmanned vehicle 200. The GPS sensor 223 can be plugged in, hardwired and/or battery operated. The GPS sensor 223 can determine the location of the unmanned vehicle 200 and/or the location of the vehicle 100, and can be used to navigate the unmanned vehicle 200. In some implementations, the unmanned vehicle 200 is configured to use a visual-inertial odometry or a Global Positioning System (GPS) or a combination of a visual-inertial odometry and a Global Positioning System (GPS) to determine the location of the unmanned vehicle 200 and/or the location of the vehicle 100, and configured to navigate itself based on the location of the unmanned vehicle 200 and/or the location of the vehicle 100.

The unmanned vehicle(s) 200 is communicatively coupled to the processor 110 of the vehicle 100 through a communications network (not shown). The communications network can be any suitable communications network(s) for transferring data. In some instances, the communication network(s) can be a wireless network such as, for example, a Wi-Fi or wireless local area network ("WLAN"), a wireless wide area network ("WWAN"), and/or a cellular network. The communication network interconnects (operatively couples) the unmanned vehicle(s) 200 with the processor 110 and/or other operational systems within the vehicle 100 and exchanges information between unmanned vehicle(s) 200 and processor 110 and/or other operational systems for controlling the operations of the unmanned vehicle(s) 200 and/or vehicle 100. The unmanned vehicle(s) 200 is disposed with the vehicle 100 and can be caused to move away from the vehicle 100 to facilitate driving or other maneuvers of the vehicle 200.

The warning controller 240 is operatively connected to the processor 210. The warning controller 240 controls warning(s) 249 (e.g., warning indicators) disposed with the unmanned vehicle(s) 200. The warning(s) 249 includes at least one of: warning sign(s) 241 (e.g., a warning triangle sign having triangular shape), a set of lights 242 (e.g., strobe lights), and signal flare(s), etc. or any combination thereof. In some implementations, the warning controller 240 can dispatch the warning(s) 249 when instructed by the processor 110 or the processor 210. For example, a warning(s) 249 can be a warning sign(s) 241 that is inflatable. For another example, the warning(s) 249 can be a warning sign(s) 241 that is mounted to the unmanned vehicle 210 via telescopic hardware (not shown). In some implementations, the warning sign(s) 241 has a folded configuration when disposed with the unmanned vehicle 200 and extended configuration when dispatched from the unmanned vehicle 200. In some implementations, the set of lights 242 is disposed with the unmanned vehicle 200. In some implementations, the set of lights 242 is configured to illuminate based on a predetermined pattern to alert the other vehicles.

The vehicle 100 can be, for example, a medium truck, heavy truck, very heavy truck, a vehicle that is greater than 14,000 pounds, a vehicle that is greater than 26,000 pounds, a vehicle that is greater than 70,000 pounds, or a vehicle that is greater than 80,000 pounds. To ensure that larger vehicles have sufficient time/distance to perform appropriate actions, tamper event may be detected sufficiently in advance.

Figure 2:
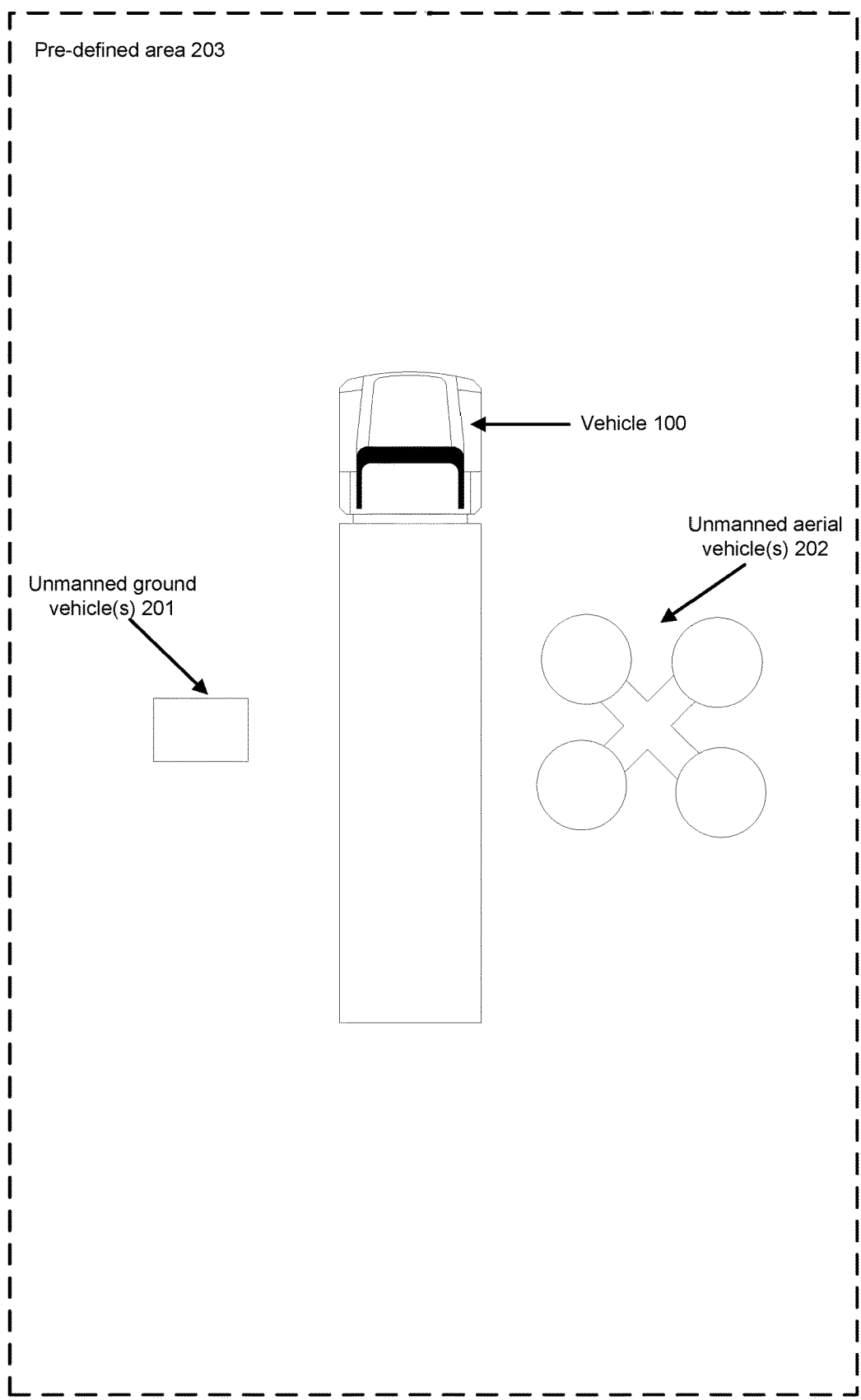
FIG. 2 is a diagram of a vehicle with unmanned vehicle(s) for safety support, according to an embodiment.

FIG. 2 is a diagram of a vehicle and unmanned vehicles for safety support, according to an embodiment. As shown in FIG. 2, the unmanned vehicles (e.g., similar to unmanned vehicle 200 in FIG. 1) include unmanned ground vehicles (UGV) 201 and unmanned aerial vehicles (UAV) 202. The unmanned vehicle(s) (e.g., unmanned vehicle(s) 200 in FIG. 1) can be one or more of any type of unmanned vehicle, such as unmanned ground vehicle (UGV), unmanned aerial vehicle (UAV), unmanned combat vehicle, unmanned underwater vehicle, unmanned micro air vehicle, drone, long-endurance unmanned vehicle, unmanned surface vehicle, miniature unmanned vehicle, etc., or any combination thereof. Although as shown in FIG. 2, one UGV 201 and one UAV 202 is included, alternatively, multiple unmanned vehicles can be included. One or more unmanned vehicles (e.g., unmanned vehicle(s) 200 in FIG. 1) can be used to collect more information with onboard sensor(s) (e.g., onboard sensor(s) 230 in FIG. 1) on the unmanned vehicle(s). For example, one, two, or more UGV(s) can be included in the system. Similarly, one, two, or more UAV(s) can be included in the system. In some implementations, one, two, or more UAV(s) and one, two, or more UGV(s), or any combination thereof can be included in the system. In some implementations, one, two, or more UAV(s), UGV(s), unmanned combat vehicle(s), unmanned underwater vehicle(s), unmanned micro air vehicle(s), drone(s), long-endurance unmanned vehicle(s), unmanned surface vehicle(s), miniature unmanned vehicle(s) etc. or any combination thereof can be included in the system. Of course, other types of unmanned vehicles exist and can be included, and the examples above are not meant to be exhaustive. The UGV 201, UAV 202 and any other unmanned vehicle(s) 200 included in the system can be disposed with the vehicle 100. The UGV 201, UAV 202 or any other unmanned vehicle(s) can be disposed inside the vehicle 100 or on the vehicle 100 via an opening(s) (not shown). The opening(s) for the unmanned vehicle(s) 200 can be an opening specifically designed for the UGV 201, UAV 202 or any other unmanned vehicle(s) or any preexisting opening or space available in or on the vehicle 100. For example, the opening or space can be a docketing station on top of the vehicle 100, a docketing station on bottom of the vehicle, a storage space in the truck, or docketing station in a trailer, etc. When instructed by a processor (e.g., processor 110 in FIG. 1) of the vehicle 100, the UGV 201, UAV 202, or any other unmanned vehicle(s) disposed with the vehicle(s) 100 can move to its target location based on the instructions. In some implementations, the processor (e.g., processor 110 in FIG. 1) releases (or deploys) the UGV 201, UAV 202 or any other unmanned vehicle(s) from the opening(s) or space in or on the vehicle 100. In some implementations, the UGV 201, UAV 202 or any other unmanned vehicle(s) can move and decouple itself from the opening or space where the UGV 201, UAV 202 or any other unmanned vehicle(s) is disposed, in response to receiving instructions from the processor (e.g., processor 110 in FIG. 1) to move to target locations. The target location of UGV 201, UAV 202, and each of the unmanned vehicle(s) in the system is located, for example, within a pre-defined area 203 surrounding the vehicle 100. The target location can include, for example, at least one of a first location being about 100 feet behind the vehicle 100, a second location being about 10 feet to a side of the vehicle 100, or a third location being about 100 feet in front of the vehicle 100. In some implementations, the UGV 201, UAV 202, and each of the unmanned vehicle(s) can be instructed by the processor (e.g., processor 110 in FIG. 1) to move back from its target location and return to the vehicle 100 to be stored in the opening or space in or on the vehicle 100 after use.

Figure 3:
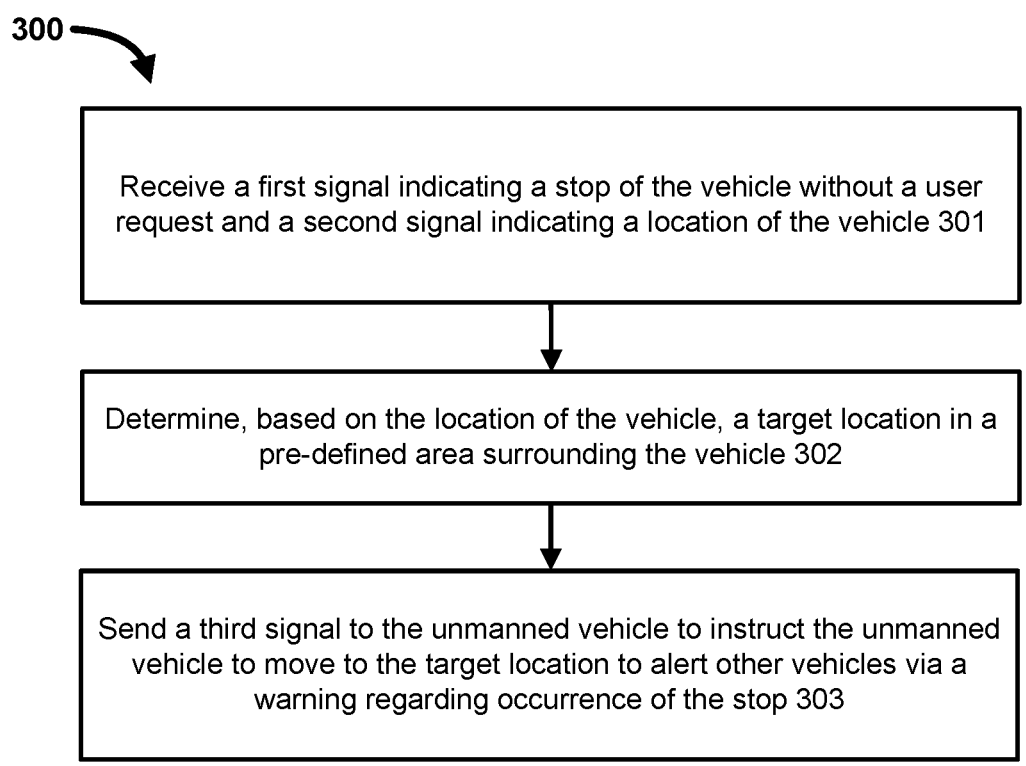
FIG. 3 is a flow diagram of a method for safety support with single unmanned vehicle and single warning, according to an embodiment.

FIG. 3 is a flow diagram of a method for safety support with unmanned vehicle(s), according to an embodiment. The method 300 of FIG. 3 can be implemented, for example, using the processor 110 of the vehicle 100 in FIG. 1.

As shown in FIG. 3, at 301, the method begins with receiving a first signal indicating a stop of a vehicle (e.g., vehicle 100 in FIG. 1). and a second signal indicating a location of the vehicle (e.g., vehicle 100 in FIG. 1). The stop of the vehicle is a stop without a user request (e.g., without driver initiation and/or control). The first signal and the second signal can be sensor signals sent from the sensor(s) (e.g., sensor(s) 130 or sensor(s) 230 in FIG. 1) and based on measurements taken by the sensor(s). In some implementations, the first signal and the second signal can be sent from the sensor(s) (e.g., sensor(s) 130 in FIG. 1) disposed on the vehicle (e.g., vehicle 100 in FIG. 1) and based on measurement taken by the sensor(s) disposed on the vehicle. In some implementations, the first signal and the second signal can be sent from the sensor(s) (e.g., sensor(s) 230 in FIG. 1) disposed on unmanned vehicle(s) (e.g., unmanned vehicle(s) 200 in FIG. 1) and based on measurement taken by the sensor(s) disposed on the unmanned vehicle.

At 302, the method continues with determining, based on the location of the vehicle (e.g., vehicle 100 in FIG. 1), a target location(s) in a pre-defined area (e.g., pre-defined area 203 in FIG. 2) surrounding the vehicle (e.g., vehicle 100 in FIG. 1). In some implementations, the target location(s) is at least one of a first location being about 100 feet behind the vehicle, a second location being about 10 feet to a side of the vehicle, or a third location being about 100 feet in front of the vehicle. In some implementations, the target location(s) includes all three locations: a first location of about 100 feet behind the vehicle, a second location of about 10 feet to a side of the vehicle, and a third location of about 100 feet in front of the vehicle. In other implementations, the target location(s) includes more than three locations. Although three specification locations are mentioned (i.e., a first location being about 100 feet behind the vehicle, a second location being about 10 feet to a side of the vehicle, and a third location being about 100 feet in front of the vehicle) additional and/or alternative locations are possible.

At 303, the method continues with sending a third signal to the unmanned vehicle (e.g., unmanned vehicle(s) 200 in FIG. 1, UGV 201 in FIG. 2, or UAV 202 in FIG. 2) to instruct the unmanned vehicle to move to the target location(s) to alert other vehicles via a warning (e.g., a warning sign 241, or a light(s) 242 in the warning controller 240 in FIG. 1) regarding the vehicle being stopped. The unmanned vehicle(s) can be any type of unmanned vehicle, such as unmanned ground vehicle (UGV), unmanned aerial vehicle (UAV), unmanned combat vehicle, unmanned underwater vehicle, unmanned micro air vehicle, drone, long-endurance unmanned vehicle, unmanned surface vehicle, miniature unmanned vehicle etc. In implementations or instances where there is only one target location, one unmanned vehicle can be instructed to move to the one target location. In other implementations or instances where there are multiple target locations, multiple unmanned vehicle(s) can be instructed to move to multiple locations. For example, a first unmanned vehicle can be instructed to move to a first target location, a second unmanned vehicle can be instructed to move to a second target location, etc.. In other implementations or instances where there are multiple target locations, a given unmanned vehicle(s) can be instructed to move to multiple target locations. For example, in an implementation/instance where there are two unmanned vehicles and four target locations, one unmanned vehicle can be instructed to move to two target locations (e.g., dropping a different warning sign at each target location) and the other unmanned vehicle can be instructed to move to the two different target locations (e.g., dropping a different warning sign at each target location). In yet another example, in an implementation/instance where there are two unmanned vehicles and four target locations, one unmanned vehicle can be instructed to move to three target locations (e.g., dropping a different warning sign at each target location) and the other unmanned vehicle can be instructed to move to the remaining one target locations (e.g., dropping a warning sign at that target location).

In some implementations, the warning is a warning sign disposed with the unmanned vehicle. The unmanned vehicle can, for example, dispatch the warning sign at the target location. In some implementations, one, two, or more unmanned vehicles each carrying one or more warning signs can be instructed to move to one, two, or more target locations to dispatch one or more warning sign(s) at the one, two, or more target locations. For example, a first unmanned vehicle can be instructed to move to a first target location to dispatch a first warning sign at the first target location, a second unmanned vehicle can be instructed to move to a second target location to dispatch a second warning sign at the second target location. In some implementations, a first unmanned vehicle can be instructed to move to a first target location to dispatch a first warning sign at the first target location, a second unmanned vehicle can be instructed to move to a second target location to dispatch a second warning sign at the second target location, and a third unmanned vehicle can be instructed to move to a third target location to dispatch a third warning sign at the third target location.

The warning sign can have, for example, a triangular shape and made of a polymer having orange and red colors with reflectors to increase visibility at night. In some implementations, the warning sign can have a folded configuration when disposed with the unmanned vehicle and an extended configuration (e.g., a triangular shape) when dispatched from the unmanned vehicle. In some implementations, the warning sign is mounted to the unmanned vehicle via a telescopic hardware (e.g., telescoping into a triangular shape). In some implementations, the warning sign is inflatable (e.g., inflating into a triangular shape). In some implementations, one, two, or more unmanned vehicles each carrying one or more folded or inflatable warning signs can be instructed to move to one, two, or more target locations to dispatch one or more emergency signs at the one, two, or more target locations. The warning signs can be folded when disposed on the unmanned vehicles and can become extended when dispatched by the unmanned vehicles. Alternatively, the warning signs can be un-inflated when disposed on the unmanned vehicles and can become inflated when dispatched by the unmanned vehicles. The warning signs such as warning triangle signs can be placed at the target locations in compliance with the rules from department of transportation from local country, state, or province to alert other vehicles sharing the same road.

In some implementations, the warning includes a set of lights (e.g., strobe lights) disposed with the unmanned vehicle. The set of lights is configured to illuminate based on a pre-determined pattern to alert the other vehicles. In some implementations, one, two, or more unmanned vehicles each having one or more lights can be instructed to move to one, two, or more target locations to place one or more lights at the one, two, or more target locations. For example, a first unmanned vehicle can be instructed to move to a first target location to place a first light at the first target location, a second unmanned vehicle can be instructed to move to a second target location to place a second light at the second target location, etc. The lights placed at the target locations are configured to illuminate based on a pre-determined pattern to alert the other vehicles. The warning(s) such a set of lights is placed at the target locations in compliance with the rules from department of transportation from local country, state, or province to alert other vehicles sharing the same road.

In some implementations, one, two, or more unmanned vehicles each having one or more folded or inflatable warning triangle signs and one or more lights can be instructed to move to one, two, or more target locations to dispatch one or more warning triangle signs at the one, two, or more target locations, and move to more target locations to place the lights. For example, a first unmanned vehicle can be instructed to move to a first target location to dispatch a first warning triangle sign at the first target location, and to move to a second target location to place a first light at the second target location, a second unmanned vehicle can be instructed to move to a third target location to dispatch a second warning triangle sign at the third target location and to move to a fourth target location to place a second light at the fourth target location, etc. The warning triangle signs can be folded when disposed on the unmanned vehicles and can become extended when dispatched by the unmanned vehicles. Alternatively, the warning triangle signs can be un-inflated when disposed on the unmanned vehicles and can become inflated when dispatched by the unmanned vehicles. The lights placed at the target locations are configured to illuminate based on a pre-determined pattern to alert the other vehicles. The warnings such as warning triangle signs and lights are placed at the target locations in compliance with the rules from department of transportation from local country, state, or province to alert other vehicles sharing the same road. In some implementations, the unmanned vehicle(s) can deploy a warning sign and a light one or more target locations.

In some implementations, the unmanned vehicle (e.g., unmanned vehicle(s) 200 in FIG. 1, UGV 201 in FIG. 2, or UAV 202 in FIG. 2) is configured to use a visual-inertial odometry (VIO) to move to the target location. VIO is a process of estimating a state (e.g., pose and velocity) of an agent (e.g., e.g., unmanned vehicle(s) 200 in FIG. 1, UGV 201 in FIG. 2, or UAV 202 in FIG. 2) by using input of one or more cameras (e.g., camera 221 in FIG. 1) plus one or more IMUs (e.g., IMU 222 in FIG.1). For example, the unmanned vehicle (e.g., unmanned vehicle(s) 200 in FIG. 1, UGV 201 in FIG. 2, or UAV 202 in FIG. 2) can include a camera (e.g., camera 221 in FIG. 1) and an IMU (e.g., IMU 222 in FIG. 1). The IMU and the camera on the unmanned vehicle (e.g., unmanned vehicle(s) 200 in FIG. 1, UGV 201 in FIG. 2, or UAV 202 in FIG. 2) work together to establish visual-inertial odometry that can determine the location of the unmanned vehicle and/or the location of the vehicle (e.g., vehicle 100 in FIG. 1), and navigate the unmanned vehicle to move to the target location. The IMU and the camera on the unmanned vehicle (e.g., unmanned vehicle(s) 200 in FIG. 1, UGV 201 in FIG. 2, or UAV 202 in FIG. 2) are configured to communicate with the processor (e.g., processor 110 in FIG. 1). For example, The IMU and the camera on the unmanned vehicle (e.g., unmanned vehicle(s) 200 in FIG. 1, UGV 201 in FIG. 2, or UAV 202 in FIG. 2) can send the second signal to the processor (e.g., processor 110 in FIG. 1). In some implementations, the second signal includes data indicating geography in the pre-defined area (e.g., pre-defined area 203 in FIG. 2) surrounding the vehicle. The data indicating geography in the pre-defined area can be received, for example, from sensor(s) (e.g., sensor(s) 130 in FIG. 1) on the vehicle, or from sensor(s) (e.g., sensor(s) 230 in FIG. 2) on the unmanned vehicle(s). The processor is configured to determine, based on the data indicating the geography, a warning zone including the target location to alert the other vehicles. The camera be for example one or more of: a thermal imager camera, an infrared camera, a stereo camera, a time of flight camera, an red/green/blue (RGB) camera, a 2-D camera, a 3-D camera, a 360-degree camera, etc. The IMU can include one or more of accelerometer, gyroscope, magnetometer or any combination thereof.

In some implementations, the unmanned vehicle (e.g., unmanned vehicle(s) 200 in FIG. 1, UGV 201 in FIG. 2, or UAV 202 in FIG. 2) is configured to use a Global Positioning System (GPS) (e.g., GPS sensor 223 in FIG. 1) to move to the target location. In some implementations, the unmanned vehicle (e.g., unmanned vehicle(s) 200 in FIG. 1, UGV 201 in FIG. 2, or UAV 202 in FIG. 2) includes a GPS sensor (e.g., GPS sensor 223) configured to send the second signal to the processor (e.g., processor 110 in FIG. 1). For example, the unmanned vehicle (e.g., unmanned vehicle(s) 200 in FIG. 1, UGV 201 in FIG. 2, or UAV 202 in FIG. 2) can include a GPS sensor (e.g., GPS sensor 223). The GPS sensor (e.g., GPS sensor 223) on the unmanned vehicle (e.g., unmanned vehicle(s) 200 in FIG. 1, UGV 201 in FIG. 2, or UAV 202 in FIG. 2) can determine the location of the unmanned vehicle and/or the location of the vehicle (e.g., vehicle 100 in FIG. 1), and navigate the unmanned vehicle to move to the target location. The GPS sensor (e.g., GPS sensor 223) is configured to communicate with the processor (e.g., processor 110 in FIG. 1). For example, GPS sensor (e.g., GPS sensor 223) on the unmanned vehicle (e.g., unmanned vehicle(s) 200 in FIG. 1, UGV 201 in FIG. 2, or UAV 202 in FIG. 2) can send the second signal to the processor (e.g., processor 110 in FIG. 1). In some implementations, the second signal includes data indicating geography in the pre-defined area (e.g., pre-defined area 203 in FIG. 2) surrounding the vehicle. The data indicating geography in the pre-defined area can be received, for example, from sensor(s) (e.g., sensor(s) 130 in FIG. 1) on the vehicle, or from sensor(s) (e.g., sensor(s) 230 in FIG. 2) on the unmanned vehicle(s). The processor is configured to determine, based on the data indicating the geography, a warning zone including the target location to alert the other vehicles. The GPS sensor can be operatively coupled (e.g., removably coupled) to the unmanned vehicle, hardwired onto the unmanned vehicle and/or battery operated and disposed on the unmanned vehicle. In some implementations, the unmanned vehicle (e.g., unmanned vehicle(s) 200 in FIG. 1, UGV 201 in FIG. 2, or UAV 202 in FIG. 2) is configured to use a combination of a visual-inertial odometry and a Global Positioning System (GPS) (e.g., GPS sensor 223 in FIG. 1) to move to the target location.

In some implementations, a camera (e.g., camera 221 in FIG. 1) is disposed with the unmanned vehicle (e.g., unmanned vehicle(s) 200 in FIG. 1, UGV 201 in FIG. 2, or UAV 202 in FIG. 2). The camera is configured to capture an image of a surrounding of the vehicle (e.g., vehicle 100 in FIG. 1) and configured to send the image to the processor (e.g., processor 110 in FIG. 1). The processor (e.g., processor 110 in FIG. 1) is configured to determine, based on the image, the target location(s). The camera be for example one or more of: a thermal imager camera, an infrared camera, a stereo camera, a time of flight camera, an red/green/blue (RGB) camera, a 2-D camera, a 3-D camera, a 360-degree camera, etc. In some implementations, the camera (e.g., camera 221 in FIG. 1) disposed with the unmanned vehicle (e.g., unmanned vehicle(s) 200 in FIG. 1, UGV 201 in FIG. 2, or UAV 202 in FIG. 2) can continuously (or repeatedly, non-continuously) monitor and capture images and/or videos of the surrounding of the vehicle (e.g., vehicle 100 in FIG. 1) and send the images and/or videos to the processor (e.g., processor 110 in FIG. 1) in a situation of a sensor (e.g., sensor(s) 130 on vehicle 100 in FIG. 1) failure and/or malfunction on the vehicle (e.g., vehicle 100 in FIG. 1) to ensure (or improve) the safety operation of the vehicle. In some implementations, the camera (e.g., camera 221 in FIG. 1) disposed with the unmanned vehicle (e.g., unmanned vehicle(s) 200 in FIG. 1, UGV 201 in FIG. 2, or UAV 202 in FIG. 2) can continuously (or repeatedly, non-continuously) monitor and capture images and/or videos of the surrounding of the vehicle (e.g., vehicle 100 in FIG. 1) and send the images and/or videos to the processor (e.g., processor 110 in FIG. 1) in addition to the information captured from sensor (e.g., sensor(s) 130 on vehicle 100 in FIG. 1) to further aid and improve maneuvers of the vehicle (e.g., vehicle 100 in FIG. 1). In some implementations, the processor (e.g., processor 110 in FIG. 1) is configured to determine, based on the image and/or video received from the camera (e.g., camera 221 in FIG. 1), the target location(s). In some implementations, one, two, or more target locations can be determined based on the image and/or video received from the camera (e.g., camera 221 in FIG. 1).

In some implementations, the processor (e.g., processor 110 in FIG. 1) is configured to send a signal to request assistance from a first responder, for example, from a first responder in case of an emergency.

In some implementations, The processor (e.g., processor 110 in FIG. 1) is configured to send a signal to the vehicle (e.g., vehicle 100 in FIG. 1) to facilitate autonomous driving of the vehicle based on the image. For example, the processor (e.g., processor 110 in FIG. 1) can send a signal to the vehicle (e.g., vehicle 100 in FIG. 1) to facilitate autonomous driving of the vehicle based on the image in a situation of a sensor (e.g., sensor(s) 130 on vehicle 100 in FIG. 1) failure and/or malfunction on the vehicle (e.g., vehicle 100 in FIG. 1) to ensure (or improve) the safety of autonomous driving (or semi-autonomous driving) of the vehicle. In some implementations, the processor (e.g., processor 110 in FIG. 1) is configured to send a signal to the vehicle (e.g., vehicle 100 in FIG. 1) to facilitate autonomous driving (or semi-autonomous driving) of the vehicle based on the image in addition to other information captured from sensor (e.g., sensor(s) 130 on vehicle 100 in FIG. 1) to further facilitate autonomous driving of the vehicle.

Figure 4:
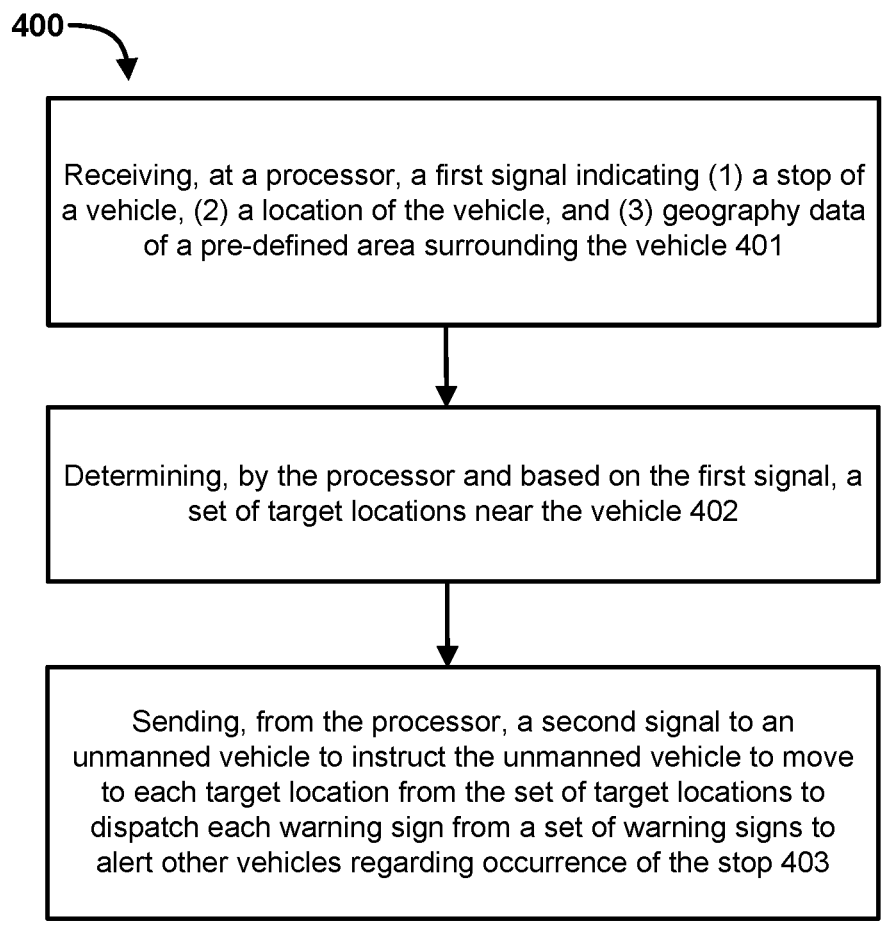
FIG. 4 is a flow diagram of a method for safety support with single unmanned vehicle and multiple warnings, according to another embodiment.

FIG. 4 is a flow diagram of a method for safety support with unmanned vehicle(s), according to another embodiment. The method 400 of FIG. 4 can be implemented, for example, using the processor 110 of the vehicle 100 in FIG. 1.

As shown in FIG. 4, at 401, the method begins with receiving, at a processor (e.g., processor 110 in FIG. 1), a first signal indicating (1) a stop of a vehicle (e.g., vehicle 100 in FIG. 1), (2) a location of the vehicle (e.g., vehicle 100 in FIG. 1), and (3) geography data of a pre-defined area (e.g., pre-defined area 203 in FIG. 2) surrounding the vehicle (e.g., vehicle 100 in FIG. 1). In some instances, the stop of the vehicle is a stop without a user request; in other instances, the stop of the vehicle is a stop with a user request. The location of the vehicle can be detected by sensor(s) (e.g., sensor(s) 130 on vehicle 100 in FIG. 1) disposed on the vehicle and/or by sensor(s) (e.g., sensor(s) 230 on unmanned vehicle 200 in FIG. 1) disposed on the unmanned vehicle (e.g., unmanned vehicle 200). The geography data of a pre-defined area (e.g., pre-defined area 203 in FIG. 2) surrounding the vehicle (e.g., vehicle 100 in FIG. 1) can be detected by sensor(s) (e.g., sensor(s) 130 on vehicle 100 in FIG. 1) disposed on the vehicle and/or sensor(s) (e.g., sensor(s) 230 on unmanned vehicle 200 in FIG. 1) disposed on the unmanned vehicle (e.g., unmanned vehicle 200).

At 402, the method continues with determining, by the processor (e.g., processor 110 in FIG. 1) and based on the first signal, a set of target locations near the vehicle (e.g., vehicle 100 in FIG. 1). In some implementations, the set of target locations can include at least one of: a first location of about 100 feet behind the vehicle, a second location of about 10 feet to a side of the vehicle, and a third location of about 100 feet in front of the vehicle, or any combination thereof. In some implementations, the set of target locations is determined in compliance with the rules from department of transportation from local country, state, or province to alert other vehicles sharing the same road.

At 403, the method continues with sending, from the processor (e.g., processor 110 in FIG. 1), a second signal to an unmanned vehicle (e.g., unmanned vehicle(s) 200 in FIG. 1, UGV 201 in FIG. 2, or UAV 202 in FIG. 2) to instruct the unmanned vehicle to move to each target location from the set of target locations to dispatch each warning sign from a set of warning signs to alert other vehicles regarding occurrence of the stop. For example, the unmanned vehicle (e.g., unmanned vehicle(s) 200 in FIG. 1, UGV 201 in FIG. 2, or UAV 202 in FIG. 2) can be instructed to move to a first target location to dispatch a first warning sign, then move to a second location to dispatch a second warning sign, then move to a third location to dispatch a third warning sign, and/or so forth. Of course, the examples above of one, two, and three target locations are not meant to be exclusive, one, two, three, or more target locations can be determined and the unmanned vehicle can be instructed to dispatch the one, two, three, or more warning signs to the one, two, three, or more target locations, respectively.

In some implementations, the unmanned vehicle (e.g., unmanned vehicle 200 in FIG. 1) is an unmanned aerial vehicle (e.g., UAV 202 in FIG. 2) or an unmanned ground vehicle (UGV 201 in FIG. 2). In some implementations, the unmanned vehicle(s) can be any type of unmanned vehicle, such as unmanned ground vehicle (UGV), unmanned aerial vehicle (UAV), unmanned combat vehicle, unmanned underwater vehicle, unmanned micro air vehicle, drone, long-endurance unmanned vehicle, unmanned surface vehicle, miniature unmanned vehicle etc. Although in step 403, only one unmanned vehicle is instructed to move to the set of target locations, in alternative implementations, one, two, or more unmanned vehicle(s) can be instructed to move to one or more of the set of target locations, respectively.

In some implementations, each warning sign of the set of warning signs is a warning triangle sign. In some implementations, each warning triangle sign can have a folded configuration when disposed with the unmanned vehicle and an extended configuration when dispatched from the unmanned vehicle. In some implementations, the warning triangle sign is mounted to the unmanned vehicle via a telescopic hardware. In some implementations, the warning triangle warning sign is inflatable. The warning signs such as warning triangle signs are placed at the target locations in compliance with the rules from department of transportation from local country, state, or province to alert other vehicles sharing the same road.

Alternatively or in addition, other types of warning can be used in lieu of or in addition to warning signs such as lights, flares, etc.

Figure 5:
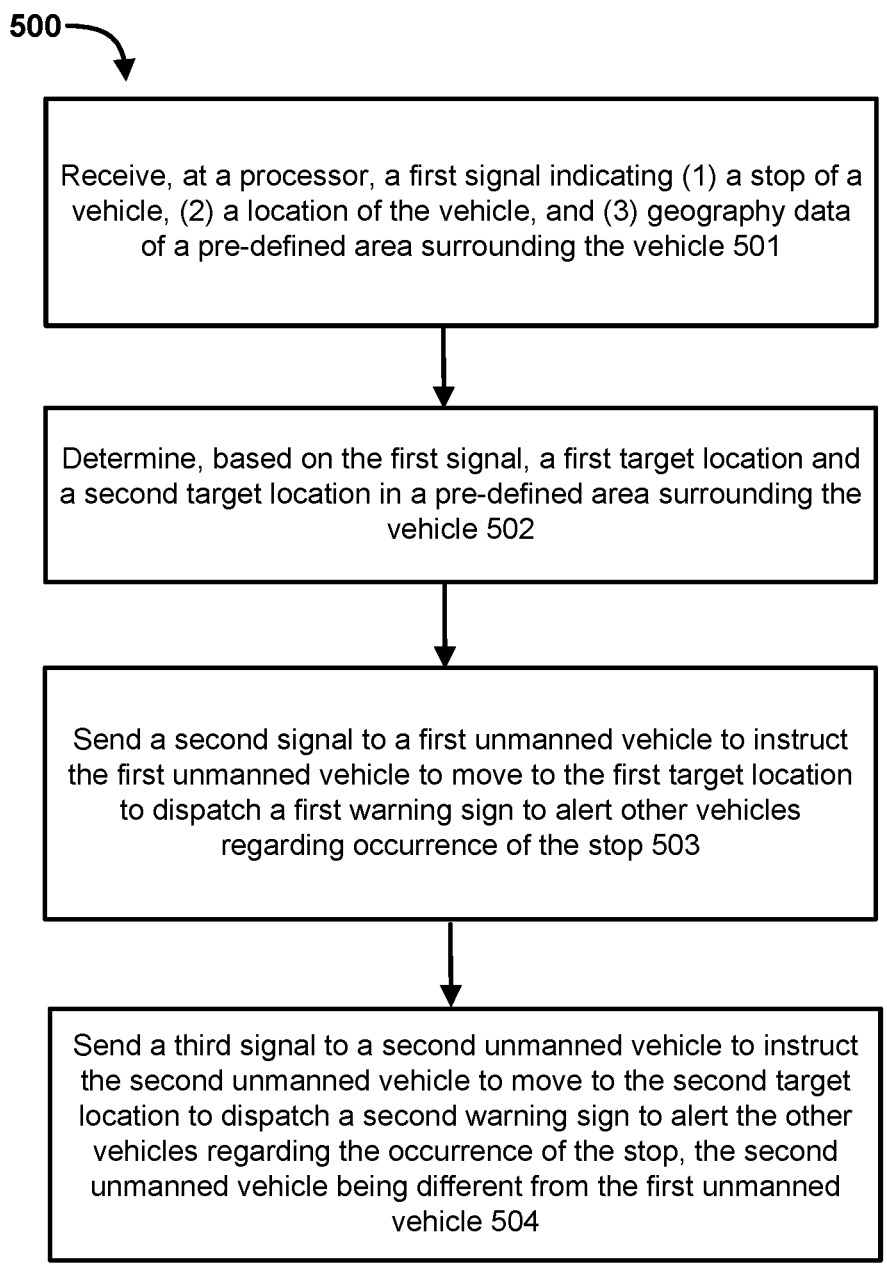
FIG. 5 is a flow diagram of a method for safety support with multiple unmanned vehicles, according to yet another embodiment.

FIG. 5 is a flow diagram of a method for safety support with unmanned vehicle(s), according to yet another embodiment. The method 500 of FIG. 5 can be implemented, for example, using the processor 110 of the vehicle 100 in FIG. 1.

As shown in FIG. 5, at 501, the method begins with receiving, at a processor (e.g., processor 110 in FIG. 1), a first signal indicating (1) a stop of a vehicle (e.g., vehicle 100 in FIG. 1), (2) a location of the vehicle, and (3) geography data of a pre-defined area (e.g., pre-defined area 203 in FIG. 2) surrounding the vehicle. In some implementations, the stop of the vehicle is a stop without a user request (e.g., without driver initiation or control); in some implementations, the stop of the vehicle is a stop with a user request. In some implementations, the location of the vehicle is detected by sensor(s) (e.g., sensor(s) 130 on vehicle 100 in FIG. 1) disposed on the vehicle. In some implementations, the location of the vehicle is detected by sensor(s) (e.g., sensor(s) 230 on unmanned vehicle 200 in FIG. 1) disposed on the unmanned vehicle (e.g., unmanned vehicle 200). The location of the vehicle can be detected, for example, by a combination of sensor(s) disposed on the vehicle (e.g., sensor(s) 130 on vehicle 100 in FIG. 1) and/or on the unmanned vehicle (e.g., sensor(s) 230 on unmanned vehicle 200 in FIG. 1). The geography data of a pre-defined area (e.g., pre-defined area 203 in FIG. 2) surrounding the vehicle (e.g., vehicle 100 in FIG. 1) can be detected, for example, by sensor(s) (e.g., sensor(s) 130 on vehicle 100 in FIG. 1) disposed on the vehicle and/or sensor(s) (e.g., sensor(s) 230 in FIG. 1) disposed on the unmanned vehicle (e.g., unmanned vehicle 200).

At 502, the method continues with determining, based on the first signal, a first target location and a second target location in a pre-defined area (e.g., pre-defined area 203 in FIG. 2) surrounding the vehicle (e.g., vehicle 100 in FIG. 1). In some implementations, the first target location and the second target location can include at least one of: a first location of about 100 feet behind the vehicle, a second location of about 10 feet to a side of the vehicle, and a third location of about 100 feet in front of the vehicle, or any combination thereof. In some implementations, the first target location and the second target location are determined in compliance with the rules from department of transportation from local country, state, or province to alert other vehicles sharing the same road.

At 503, the method continues with sending a second signal to a first unmanned vehicle (e.g., unmanned vehicle(s) 200 in FIG. 1, UGV 201 in FIG. 2, or UAV 202 in FIG. 2) to instruct the first unmanned vehicle to move to the first target location to dispatch a first warning (e.g., a first warning sign) to alert other vehicles regarding occurrence of the stop. In some implementations, the first unmanned vehicle (e.g., unmanned vehicle 200 in FIG. 1) is an unmanned aerial vehicle (e.g., UAV 202 in FIG. 2) or an unmanned ground vehicle (UGV 201 in FIG. 2). For example, the first unmanned vehicle(s) can be any type of unmanned vehicle, such as unmanned ground vehicle (UGV), unmanned aerial vehicle (UAV), unmanned combat vehicle, unmanned underwater vehicle, unmanned micro air vehicle, drone, long-endurance unmanned vehicle, unmanned surface vehicle, miniature unmanned vehicle, etc. In some implementations, the warning is a warning triangle sign. For example, the warning triangle sign can have a folded configuration when disposed with the unmanned vehicle and an extended configuration when dispatched from the unmanned vehicle. The warning triangle sign can be, for example, mounted to the unmanned vehicle via a telescopic hardware. For another example, the warning triangle sign is inflatable. The warning signs such as warning triangle signs are placed at the target locations in compliance with the rules from department of transportation from local country, state, or province to alert other vehicles sharing the same road.

At 504, the method continues with sending a third signal to a second unmanned vehicle (e.g., unmanned vehicle(s) 200 in FIG. 1, UGV 201 in FIG. 2, or UAV 202 in FIG. 2) to instruct the second unmanned vehicle to move to the second target location to dispatch a second warning (e.g., a second warning sign) to alert other vehicles regarding the occurrence of the stop. The second unmanned vehicle is different from the first unmanned vehicle. In some implementations, the second unmanned vehicle (e.g., unmanned vehicle 200 in FIG. 1) is an unmanned aerial vehicle (e.g., UAV 202 in FIG. 2) or an unmanned ground vehicle (UGV 201 in FIG. 2). For example, the second unmanned vehicle(s) can be any type of unmanned vehicle, such as unmanned ground vehicle (UGV), unmanned aerial vehicle (UAV), unmanned combat vehicle, unmanned underwater vehicle, unmanned micro air vehicle, drone, long-endurance unmanned vehicle, unmanned surface vehicle, miniature unmanned vehicle etc., and different from the first unmanned vehicle. For example, the first unmanned vehicle can be a UGV (e.g., UGV 201 in FIG. 2), and the second unmanned vehicle can be a UAV (e.g., UAV 202 in FIG. 2).

Alternatively, for example, the first unmanned vehicle can be an aerial drone, and the second unmanned vehicle can be miniature unmanned ground vehicle. Of course, any combination of different unmanned vehicles above can be the first and the second unmanned vehicles, the examples are not meant to be exclusive. In some implementations, the warning is an warning triangle sign. For example, the warning triangle sign can have a folded configuration when disposed with the unmanned vehicle and an extended configuration when dispatched from the unmanned vehicle. Such a warning triangle sign can be, for example, mounted to the unmanned vehicle via a telescopic hardware. In some implementations, the warning triangle sign is inflatable. The warning signs such as warning triangle signs can be placed at the target locations in compliance with the rules from department of transportation from local country, state, or province to alert other vehicles sharing the same road.

In some embodiments, an apparatus, comprises an unmanned vehicle configured to be disposed with a vehicle and a processor operatively coupled to the unmanned vehicle. The processor is configured to receive a first signal indicating a stop of the vehicle without a user request and a second signal indicating a location of the vehicle. The processor is configured to determine, based on the location of the vehicle, a target location in a pre-defined area surrounding the vehicle. The processor is configured to send a third signal to the unmanned vehicle to instruct the unmanned vehicle to move to the target location to alert other vehicles via a warning regarding occurrence of the stop.

In some embodiments, the unmanned vehicle is an unmanned aerial vehicle or an unmanned ground vehicle.

In some embodiments, the warning is a warning sign disposed with the unmanned vehicle. The unmanned vehicle is configured to dispatch the warning sign at the target location.

In some embodiments, the warning sign is a warning triangle sign.

In some embodiments, the warning sign is a warning triangle sign that has a folded configuration when disposed with the unmanned vehicle and an extended configuration when dispatched from the unmanned vehicle.

In some embodiments, the warning sign is mounted to the unmanned vehicle via a telescopic hardware.

In some embodiments, the warning sign is inflatable.

In some embodiments, the target location is at least one of a first location being about 100 feet behind the vehicle, a second location being about 10 feet to a side of the vehicle, or a third location being about 100 feet in front of the vehicle.

In some embodiments, the unmanned vehicle is configured to use a visual-inertial odometry or a Global Positioning System (GPS) to move to the target location.

In some embodiments, the apparatus further comprises a GPS sensor configured to send the second signal to the processor.

In some embodiments, the second signal includes data indicating geography in the pre-defined area surrounding the vehicle. The processor is configured to determine, based on the data indicating the geography, a warning zone including the target location to alert the other vehicles.

In some embodiments, the warning includes a set of lights disposed with the unmanned vehicle. The set of lights is configured to illuminate based on a pre-determined pattern to alert the other vehicles.

In some embodiments, the apparatus further comprises a camera disposed with the unmanned vehicle. The camera is configured to capture an image of a surrounding of the vehicle and configured to send the image to the processor. The processor is configured to determine, based on the image, the target location.

In some embodiments, the apparatus further comprises a camera disposed with the unmanned vehicle. The camera is configured to capture an image of a surrounding of the vehicle and configured to send the image to the processor. The processor configured to send a fourth signal to request assistance from a first responder.

In some embodiments, the apparatus further comprises a camera disposed with the unmanned vehicle. The camera is configured to capture an image of a surrounding of the vehicle and configured to send the image to the processor. The processor is configured to send a fourth signal to vehicle to facilitate autonomous driving of the vehicle based on the image.

In some embodiments, a method, comprises receiving, at a processor, a first signal indicating (1) a stop of a vehicle, (2) a location of the vehicle, and (3) geography data of a pre-defined area surrounding the vehicle. The method also includes determining, by the processor and based on the first signal, a set of target locations near the vehicle. The method includes sending, from the processor, a second signal to an unmanned vehicle to instruct the unmanned vehicle to move to each target location from the set of target locations to dispatch each warning sign from a set of warning signs to alert other vehicles regarding occurrence of the stop.

In some embodiments, the unmanned vehicle is an unmanned aerial vehicle or an unmanned ground vehicle.

In some embodiments, each warning sign of the set of warning signs is a warning triangle sign.

In some embodiments, each warning sign of the set of warning signs has a folded configuration when disposed with the unmanned vehicle and an extended configuration when dispatched from the unmanned vehicle.

In some embodiments, non-transitory processor-readable medium storing code representing instructions to be executed by a processor, the code comprises code to cause the processor to receive, at a processor, a first signal indicating (1) a stop of a vehicle, (2) a location of the vehicle, and (3) geography data of a pre-defined area surrounding the vehicle. The code also causes the processor to determine, based on the first signal, a first target location and a second target location in a pre-defined area surrounding the vehicle. The code causes the processor to send a second signal to a first unmanned vehicle to instruct the first unmanned vehicle to move to the first target location to dispatch a first warning sign to alert other vehicles regarding occurrence of the stop. The code causes the processor to send a third signal to a second unmanned vehicle to instruct the second unmanned vehicle to move to the second target location to dispatch a second warning sign to alert the other vehicles regarding the occurrence of the stop, the second unmanned vehicle being different from the first unmanned vehicle.

All combinations of the foregoing concepts and additional concepts discussed herewith (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational algorithm, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

As used herein, "substantially in real-time" can refer to an event that occurs immediately following a predicate event, adjusted for processing-related delays (e.g., computation delay, transmission delay, etc.).

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus, comprising:
   an unmanned vehicle configured to be disposed with a vehicle; and
   a processor operatively coupled to the unmanned vehicle;
     the processor configured to receive a first signal indicating a stop of the vehicle without a user request and a second signal indicating a location of the vehicle,
     the processor configured to determine, based on the location of the vehicle, a target location in a pre-defined area surrounding the vehicle,
     the processor configured to send a third signal to the unmanned vehicle to instruct the unmanned vehicle to move to the target location to alert other vehicles via a warning regarding occurrence of the stop.

2. The apparatus of claim 1, wherein the unmanned vehicle is an unmanned aerial vehicle or an unmanned ground vehicle.

3. The apparatus of claim 1, wherein:
   the warning is a warning sign disposed with the unmanned vehicle;
   the unmanned vehicle configured to dispatch the warning sign at the target location.

4. The apparatus of claim 3, wherein the warning sign is a warning triangle sign.

5. The apparatus of claim 3, wherein the warning sign is a warning triangle sign that has a folded configuration when disposed with the unmanned vehicle and an extended configuration when dispatched from the unmanned vehicle.

6. The apparatus of claim 3, wherein the warning sign is mounted to the unmanned vehicle via a telescopic hardware.

7. The apparatus of claim 3, wherein the warning sign is inflatable.

8. The apparatus of claim 3, wherein:
   the target location is at least one of a first location being about 100 feet behind the vehicle, a second location being about 10 feet to a side of the vehicle, or a third location being about 100 feet in front of the vehicle.

9. The apparatus of claim 1, wherein the unmanned vehicle is configured to use a visual-inertial odometry or a Global Positioning System (GPS) to move to the target location.

10. The apparatus of claim 1, further comprising:
    a GPS sensor configured to send the second signal to the processor.

11. The apparatus of claim 1, wherein:
    the second signal includes data indicating geography in the pre-defined area surrounding the vehicle;
    the processor configured to determine, based on the data indicating the geography, a warning zone including the target location to alert the other vehicles.

12. The apparatus of claim 1, wherein:
    the warning includes a set of lights disposed with the unmanned vehicle;
    the set of lights configured to illuminate based on a pre-determined pattern to alert the other vehicles.

13. The apparatus of claim 1, further comprising:
a camera disposed with the unmanned vehicle,
the camera configured to capture an image of a surrounding of the vehicle and configured to send the image to the processor,
the processor configured to determine, based on the image, the target location.

14. The apparatus of claim 1, further comprising:
a camera disposed with the unmanned vehicle,
the camera configured to capture an image of a surrounding of the vehicle and configured to send the image to the processor;
the processor configured to send a fourth signal to request assistance from a first responder.

15. The apparatus of claim 1, further comprising:
a camera disposed with the unmanned vehicle,
the camera configured to capture an image of a surrounding of the vehicle and configured to send the image to the processor;
the processor configured to send a fourth signal to vehicle to facilitate autonomous driving of the vehicle based on the image.

16. A method, comprising:
receiving, at a processor, a first signal indicating (1) a stop of a vehicle, (2) a location of the vehicle, and (3) geography data of a pre-defined area surrounding the vehicle;
determining, by the processor and based on the first signal, a set of target locations near the vehicle; and
sending, from the processor, a second signal to an unmanned vehicle to instruct the unmanned vehicle to move to each target location from the set of target locations to dispatch each warning sign from a set of warning signs to alert other vehicles regarding occurrence of the stop.

17. The method of claim 16, wherein the unmanned vehicle is an unmanned aerial vehicle or an unmanned ground vehicle.

18. The method of claim 16, wherein each warning sign of the set of warning signs is a warning triangle sign.

19. The method of claim 16, wherein each warning sign of the set of warning signs has a folded configuration when disposed with the unmanned vehicle and an extended configuration when dispatched from the unmanned vehicle.

20. A non-transitory processor-readable medium storing code representing instructions to be executed by a processor, the code comprising instructions to cause the processor to:
receive, at the processor, a first signal indicating (1) a stop of a vehicle, (2) a location of the vehicle, and (3) geography data of a pre-defined area surrounding the vehicle;
determine, based on the first signal, a first target location and a second target location in a pre-defined area surrounding the vehicle;
send a second signal to a first unmanned vehicle to instruct the first unmanned vehicle to move to the first target location to dispatch a first warning sign to alert other vehicles regarding occurrence of the stop; and
send a third signal to a second unmanned vehicle to instruct the second unmanned vehicle to move to the second target location to dispatch a second warning sign to alert the other vehicles regarding the occurrence of the stop, the second unmanned vehicle being different from the first unmanned vehicle.

* * * * *